June 2, 1970 R. B. SCHILLING ET AL 3,515,953

ADAPTIVE DIODE HAVING MOBILE DOPING IMPURITIES

Filed March 21, 1967

INVENTORS
RONALD B. SCHILLING &
CHARLOTTE DOBIN

BY W. S. Hill
AGENT

United States Patent Office 3,515,953
Patented June 2, 1970

3,515,953
ADAPTIVE DIODE HAVING MOBILE DOPING IMPURITIES

Ronald B. Schilling, East Brunswick, and Charlotte Dobin, Trenton, N.J., assignors to RCA Corporation, a corporation of Delaware Filed Mar. 21, 1967, Ser. No. 624,923
Int. Cl. H01l 5/00
U.S. Cl. 317—234 3 Claims

ABSTRACT OF THE DISCLOSURE

An adaptive diode capable of being repeatedly switched between a resistive state and a rectifying state. The device comprises a body of semiconducting germanium having an N-type region doped to saturation with a mobile impurity, such as lithium. Part of the lithium is present as a separate phase in the form of discrete inclusions capable of migrating in the body under the influence of an applied electric field. The device also includes an alloyed P-type region composed of indium and either lead or tin. The device is switched from the resistive state to the diode state by application of a heavy current forward bias on the P-N junction. Switching from the diode to the resistive state is accomplished by a heavy current reverse bias.

BACKGROUND OF THE INVENTION

A previously known device of this type is described in U.S. Pat. 3,264,532, issued Aug. 2, 1966, to J. O. Kessler. The device which is the subject of the Kessler patent can be made by, first, diffusing a relatively mobile N type impurity, such as lithium, into a thin body of P type germanium to convert the entire body to N type, and then subjecting the N type body to a heat treatment to convert a surface layer back to P type, thus forming a P-N junction in the body. Ohmic contacts in the form of solder dots are placed on the N-type region and on the P-type region. One or both of the N-type and P-type regions contains inclusions, as separate phases, of the elemental form of the mobile impurity. The junction region includes nucleation centers for producing, as by precipitation, the inclusions in the junction region.

In one of its modes of operation, the device operates as an ordinary rectifier. That is, when the P-N junction is biased in the forward direction it passes a relatively high current, and, when it is biased in the back direction, it passes a relatively low current. In its other mode of operation, it passes a relatively high current in both directions. And, in addition, it can be adapted to have intermediate ratios of forward-to-back current.

The adaption is carried out by heating the device to between 100° C. and 300° C. and simultaneously applying a voltage to the device in the backward direction of current flow. The heat, which may be applied from an external source, or generated by the current internally, increases the mobility of the mobile impurity. The voltage produces an electric field in the body which causes the inclusions to migrate into the junction, producing leakage paths through the junction, and thereby reduces the ratio of forward current to back current. The adaption process may be stopped at any point in time and, upon cooling to room temperature, the device will retain its now adapted characteristics. The device may be readapted by again heating and applying a voltage so as to cause the inclusions to migrate. The adaption process may be reversed to return to the initial I-V characteristic by heating the device as described and applying a voltage in the forward direction of current flow. Such direction of current flow causes the inclusions to migrate out of the junction and thereby increases the ratio of forward-to-back current.

Objects of the present invention are to provide an adaptive device of the type above described which has one or more of a higher ratio of back-to-forward resistance in the rectifying (diode) state, a shorter switching time for a complete cycle from diode to resistive state and back again, a larger number of continuous cycles of operation possible, and a better reproducibility in fabrication.

SUMMARY OF THE INVENTION

One embodiment of the present invention is an improved device which comprises a body of semiconducting germanium having an N type region and a P type region which are separated by an abrupt P-N junction, at least one of these regions containing inclusions of a relatively mobile impurity, and nucleation centers for producing these inclusions, the P-type region containing indium as an impurity and at least one of lead and tin.

The invention also includes methods of making the improved semiconductor device, comprising:

(a) forming an N type region in a germanium semiconducting body by diffusing lithium (or other mobile impurity) from a pure source into a surface of the body such that said body is supersaturated with lithium (or other mobile impurity), said body having been provided with nucleation sites therein;

(b) annealing the body such that at least some of the excess lithium (or other mobile impurity) diffuses and precipitates on said nucleation centers as inclusions of elemental lithium; and (c) forming a P type region by fusing to a surface of the N-type region a quantity of an alloy consisting essentially of about 90–95% indium, by weight, and the balance at least one of lead and tin, an abrupt P-N junction being formed as a result of the fusing process.

Some of the devices thus formed exhibit good switching characteristics without further treatment. Those units which do not switch completely back from the resistance state to the diode state are repeatedly etched electrolytically for short periods until they do exhibit the desired switching characteristic.

DESCRIPTION OF PREFERRED EMBODIMENTS

Figure 1:
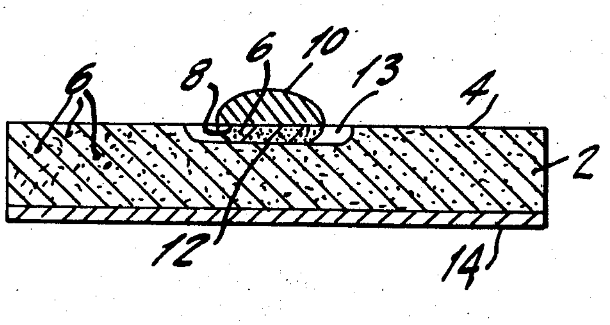
FIG. 1 is a section view of a completed device of the present invention.

A device of the present invention, as illustrated in FIG. 1, comprises a semiconductor body 2, of germanium, having an N type region 4 doped with lithium. The lithium is present in excess of the amount required to saturate the region so that some if it is present as inclusions 6 scattered throughout the region 4. The device also includes a second region 8 of P type conductivity and this region also includes some inclusions 6 of lithium. The region 8 is doped with indium and also contains a small amount of at least one of lead and tin. Between the N type region 4 and the P type region 8 is an abrupt P-N junction 12. The P type region 8 is also joined integrally with an electrode 10 composed of an alloy of indium and at least one of lead and tin. A groove 13 is formed around the alloyed dot electrode 10 by an etching processing step hereinafter described. An ohmic electrode 14 is united to a surface of the body 2 opposite the electrode 10.

Figure 2:
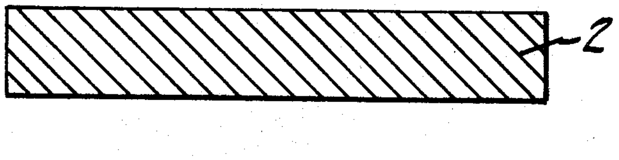
FIG. 2 is a section view of a semiconductor wafer in an early stage of making a device of the invention.

An example of manufacturing a device in accordance with the present invention is as follows. Starting material is a thin wafer 2 of single crystal germanium (FIG. 2) which may have a resistivity of 20–40 ohm cm. The wafer may be 3 mils thick, for example, and may be either N or P type. It may also, although less preferably, be polycrystalline.

A quantity of pure lithium is placed in an evaporating boat and heated to vaporize the lithium while argon gas is passed over the boat. The vaporized lithium is deposited on the exposed surfaces of the germanium wafer and diffused into the wafer (FIG. 3) at a temperature of about 500° C. for 30 minutes. After this diffusion period the resistivity of the wafer is about 0.01 ohm cm. N type.

Figure 3:
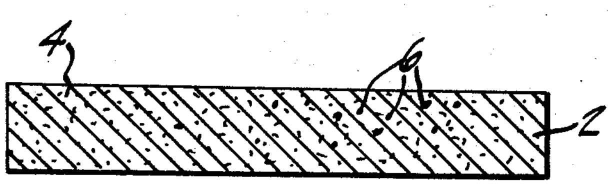
FIGS. 3–5 are similar section views illustrating successive steps in making a device in accordance with the invention.

The wafer is then annealed at room temperature for 48 hours. At the end of this period, the resistivity has risen to about 2.0 ohm cm. and it remains stable at about this level. The rise in resistivity is caused by the lithium being in a super-saturated state immediately after the high temperature diffusion step and the excess lithium then diffusing further and precipitating on nucleation sites to form inclusions 6 (FIG. 3). This reduces the amount of electrically active donor lithium.

Figure 4:
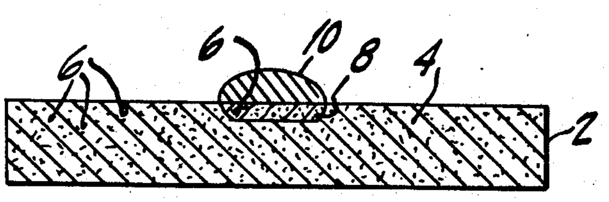
Figure 5:
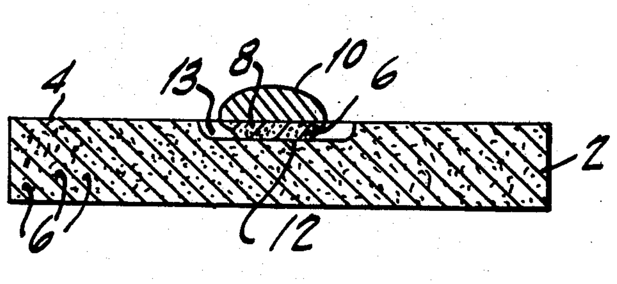

The next step, as shown in FIG. 4, is to form a recrystallized P-type region 8 by alloying a small dot 10 of an alloy composed of 90–95% indium by weight, and the remainder either lead or tin or any combination of both lead and tin to a surface of the water 2. A preferred composition is 95% indium and 5% of an alloy of 60% lead-40% tin, by weight. A P-N junction 12 is formed between the P type region 8 and the bulk of the wafer.

A preferred alloying procedure is to increase the temperature from room temperature to about 550° C. in 20 seconds and hold this temperature for a few seconds until "wetting" of the wafer surface by the dot occurs, and then remove the heat source.

After the unit has cooled to room temperature it is cleaned by acid etching for a short period, for example, about 20 seconds. The composition of the etching solution may be 2 parts by volume concentrated nitric acid and one part by volume concentrated hydrofluoric acid.

At this stage some of the units can usually be switched from the D (diode) state to the R (resistance) state and back again but many may require further treatment to enable them to be switched, by forward bias, from the R state to the D state.

Switching from the diode state to the resistance state (D→R) is accomplished by reverse biasing the unit beyond breakdown so that a current of about 0.5 amp flows. This takes one second, or less. The unit may be switched back from the resistance state to the diode state (R→D) by forward biasing to pass a forward current of about 0.5 amp. This usually takes about 15 to 30 seconds. No external heat need be applied. Passage of current generates sufficient internal heat which, together with the electric field, bring about the internal changes causing the change in state.

Where further treatment of the units is required, the following has been found to produce completely operative units. The unit is etched electrolytically with the indium-lead electrode connected to the positive terminal, for 2 minutes in 40% aqueous potassium hydroxide. The unit is then D→R switched followed by R→D switching. If, after 2 minutes of R→D switching with a forward bias of 500 ma. the unit has not fully returned to the D state it is etched again electrolytically for about 1–2 minutes. This usually results in fully returning the unit to the D state. Etching forms a groove 13 around and undercutting the alloyed dot 10 at the junction 12. Etching occurs only in the P-type region.

Switching trials may then be continued from D→R and R→D. The D→R switching is now normally complete and the unit will usually be found to have reached a stable, low value of resistance.

The R→D switching improves with each etching treatment. A total of about 10–20 minutes of etching is usually preferred, but, at any rate, etching may be repeated until no further improvement is obtained.

Rate of etching has been found to have an effect on the percentage yield of good units with reproducible back resistances of one megohm and larger in the diode state. Low values of etching current have been found to produce higher yields than high values of etching current. Values of lower than 20 ma. are preferred.

Forward bias is normally used in conjunction with electrolytic etching during the "break-in" period. When the units are forward biased for lengthy periods, i.e., up to 10 hours, more consistent switching characteristics are obtained.

After fabrication, the device may be mounted on a metal header with ordinary lead-tin solder serving as the ohmic electrode 14.

Although lithium has been given as the preferred example of a mobile impurity, other mobile impurities such as sodium or potassium may also be used.

Devices of the present invention have many possible uses. One of these is as a re-settable alarm. In this type of use the device is connected in circuit with an audible or visible alarm device, set in its diode state and so biased that it will not conduct current. However, if the device senses either a surge of heat or high voltage, it is rapidly switched to its resistance state and the circuit through the alarm device is activated.

What is claimed is:

1. An adaptive semiconductor device comprising a body of semiconducting germanium including an N type region and a P type region, an abrupt P-N junction separating said regions, at least one of said regions containing inclusions of a relatively mobile, conductivity-type-determining impurity, and nucleation centers for producing said inclusions, said P type region containing indium as a P-type impurity and the remainder either lead or tin or any combination of lead and tin.

2. A device according to claim 1 in which said relatively mobile, conductivity-type-determining impurity is lithium.

3. An adaptive semiconductor device comprising a body of semiconducting germanium including germanium including an N type region and a P type region, an abrupt P-N junction separating said regions, at least one of said regions containing inclusions of a relatively mobile, conductivity-type-determining impurity, and nucleation centers for producing said inclusions, said P type region being a recrystallized region which is in contact with an electrode composed of an alloy of 90–95% by weight indium and the balance either lead or tin or any combination of lead and tin.

References Cited

UNITED STATES PATENTS

| | | | |
|---|---|---|---|
| 3,078,397 | 2/1963 | Tummers et al. | 317—235 |
| 3,264,532 | 8/1966 | Kessler | 317—234 |
| 2,798,013 | 7/1957 | Irmler | 148—1.5 |

JOHN W. HUCKERT, Primary Examiner

B. ESTRIN, Assistant Examiner

U.S. Cl. X.R.

317—235